US012570298B2

(12) United States Patent
Ohmori et al.

(10) Patent No.: US 12,570,298 B2
(45) Date of Patent: Mar. 10, 2026

(54) VEHICLE CONTROL DEVICE, VEHICLE CONTROL PROGRAM, AND VEHICLE CONTROL METHOD

(71) Applicants: ADVICS CO., LTD., Kariya (JP); J-QuAD DYNAMICS INC., Tokyo (JP); DENSO CORPORATION, Kariya (JP); AISIN CORPORATION, Kariya (JP); JTEKT CORPORATION, Kariya (JP)

(72) Inventors: Yosuke Ohmori, Kariya (JP); Akira Ito, Kariya (JP)

(73) Assignees: ADVICS CO., LTD., Kariya (JP); J-QuAD DYNAMICS INC., Tokyo (JP); DENSO CORPORATION, Kariya (JP); AISIN CORPORATION, Kariya (JP); JTEKT CORPORATION, Kariya (JP)

( * ) Notice: Subject to any disclaimer, the term of this patent is extended or adjusted under 35 U.S.C. 154(b) by 72 days.

(21) Appl. No.: 18/695,227

(22) PCT Filed: Sep. 13, 2022

(86) PCT No.: PCT/JP2022/034250
§ 371 (c)(1),
(2) Date: Mar. 25, 2024

(87) PCT Pub. No.: WO2023/053949
PCT Pub. Date: Apr. 6, 2023

(65) Prior Publication Data
US 2024/0400070 A1 Dec. 5, 2024

(30) Foreign Application Priority Data
Sep. 29, 2021 (JP) ................................. 2021-159506

(51) Int. Cl.
B60W 50/00 (2006.01)
B60W 50/02 (2012.01)
G06N 7/01 (2023.01)

(52) U.S. Cl.
CPC ............... B60W 50/02 (2013.01); G06N 7/01 (2023.01)

(58) Field of Classification Search
CPC ................................ B60W 50/02; G06N 7/01
(Continued)

(56) References Cited

U.S. PATENT DOCUMENTS

2011/0202227 A1 8/2011 Zhang et al.
2012/0117009 A1* 5/2012 Dutt ......................... G06N 7/01
706/12
(Continued)

FOREIGN PATENT DOCUMENTS

JP 2009-51407 A 3/2009
JP 2009-193486 A 8/2009
(Continued)

OTHER PUBLICATIONS

Japanese Office Action issued Jun. 24, 2025, in corresponding Japanese Patent Application No. 2021-159506 (with English Translation), 8 pages.
(Continued)

*Primary Examiner* — Mahmoud S Ismail
(74) *Attorney, Agent, or Firm* — Oblon, McClelland, Maier & Neustadt, L.L.P.

(57) ABSTRACT

A vehicle control device includes a command unit that generates a command value for an actuator and causes a vehicle to travel by outputting the command value to a control unit, a state quantity acquiring unit that acquires at least two values of a vehicle state quantity among a vehicle state quantity ideal value, a vehicle state quantity detection
(Continued)

value, and a vehicle state quantity operation value, an event storage unit that stores multiple events that can occur when the vehicle on-board device is not functioning normally, an event acquiring unit that compares at least two values of the vehicle state quantity and acquires an event corresponding to a result of the comparison, and an anomaly determining unit that determines whether there is an anomaly in the vehicle on-board device by using a Bayesian network that includes, as a node, an occurrence probability of the event.

5 Claims, 6 Drawing Sheets

(58) Field of Classification Search
USPC .......................................................... 701/29.2
See application file for complete search history.

(56) References Cited

U.S. PATENT DOCUMENTS

| 2020/0079392 A1 | 3/2020 | Cui et al. |
| 2020/0334926 A1* | 10/2020 | Tsurumi ................. H04W 12/61 |
| 2021/0056384 A1* | 2/2021 | Ko .......................... G06N 3/006 |
| 2022/0284330 A1* | 9/2022 | Ambrus ................... G06N 7/01 |

FOREIGN PATENT DOCUMENTS

| JP | 2011-90382 A | 5/2011 |
| JP | 2019-214366 A | 12/2019 |

OTHER PUBLICATIONS

International Search report issued Nov. 22, 2022 in PCT/JP2022/034250, filed on Sep. 13, 2022, 2 pages.

* cited by examiner

Fig.5

(A) Malfunction Flag (B) Correction Amount (C) Command Value

VEHICLE CONTROL DEVICE, VEHICLE CONTROL PROGRAM, AND VEHICLE CONTROL METHOD

TECHNICAL FIELD

The present disclosure relates to a vehicle control device, a vehicle control program, and a vehicle control method.

BACKGROUND ART

Patent Literature 1 describes an example of an autonomous driving system that detects anomalies of a vehicle on-board device. The system includes a main monitoring device and an auxiliary monitoring device that monitor a vehicle on-board device subject for anomaly detection. When both the main monitoring device and the auxiliary monitoring device detect an anomaly in the vehicle on-board device, an alarm device gives a warning to an occupant of the vehicle.

CITATION LIST

Patent Literature

Patent Literature 1: Japanese Laid-Open Patent Publication No. 2019-214366

BRIEF SUMMARY

Technical Problem

In the above-described system, both the main monitoring device and the auxiliary monitoring device execute the process of determining whether there is an anomaly in the vehicle on-board device. Implementing multiple monitoring devices that execute the same determining process may lead to concerns about increased system costs.

Solution to Problem

In one general aspect, a vehicle control device is employed in a vehicle. The vehicle includes a vehicle on-board device that includes an actuator related to traveling of the vehicle, a control unit for the actuator, and a detection system that detects a state of the vehicle that changes due to operation of the actuator. The vehicle control device includes a command unit, a state quantity acquiring unit, an event storage unit, an event acquiring unit, and an anomaly determining unit. The command unit generates a command value for the actuator based on a request related to a driver assistance function from an application requesting unit, and causes the vehicle to travel by outputting the command value to the control unit. The state quantity acquiring unit acquires at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator. The event storage unit stores multiple events that can occur when the vehicle on-board device is not functioning normally. The event acquiring unit compares at least two values of the vehicle state quantity acquired by the state quantity acquiring unit and acquires an event corresponding to a result of the comparison from among the multiple events. The anomaly determining unit determines whether there is an anomaly in the vehicle on-board device by using a Bayesian network that includes, as a node, an occurrence probability of the event acquired by the event acquiring unit.

In another general aspect, a vehicle control program is executed by an execution device of a vehicle. The vehicle includes a vehicle on-board device that includes an actuator related to traveling of the vehicle, a control unit for the actuator, and a detection system that detects a state of the vehicle that changes due to operation of the actuator. The vehicle control program causes the execution device to execute a command process, a state quantity acquiring process, an event acquiring process, and an anomaly determining process. The command process generates a command value for the actuator based on a request related to a driver assistance function from an application requesting unit, and causes the vehicle to travel by outputting the command value to the control unit. The state quantity acquiring process acquires at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator. The event acquiring process compares at least two values of the vehicle state quantity acquired by the state quantity acquiring process and acquires an event corresponding to a result of the comparison from among multiple events that can occur when the vehicle on-board device is not functioning normally. The anomaly determining process determines whether there is an anomaly in the vehicle on-board device by using a Bayesian network that includes, as a node, an occurrence probability of the event acquired by the event acquiring process.

In a further general aspect, a vehicle control method is employed in a vehicle. The vehicle includes a vehicle on-board device that includes an actuator related to traveling of the vehicle, a control unit for the actuator, and a detection system that detects a state of the vehicle that changes due to operation of the actuator. The vehicle control method includes: generating a command value for the actuator based on a request related to a driver assistance function from an application requesting unit: causing the vehicle to travel by outputting the command value to the control unit: acquiring at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator: comparing multiple values of the acquired vehicle state quantity, and acquiring an event corresponding to a result of the comparison from among multiple events that can occur when the vehicle on-board device is not functioning normally; and determining whether there is an anomaly in the vehicle on-board device by using a Bayesian network that includes, as a node, an occurrence probability of the acquired event.

BRIEF DESCRIPTION OF DRAWINGS

FIG. 5 is a diagram showing a first event and a second event among the events shown in FIG. 3.

DESCRIPTION OF EMBODIMENTS

A vehicle control device, a vehicle control program, and a vehicle control method according to one embodiment will now be described with reference to FIGS. 1 to 7.

Figure 1:
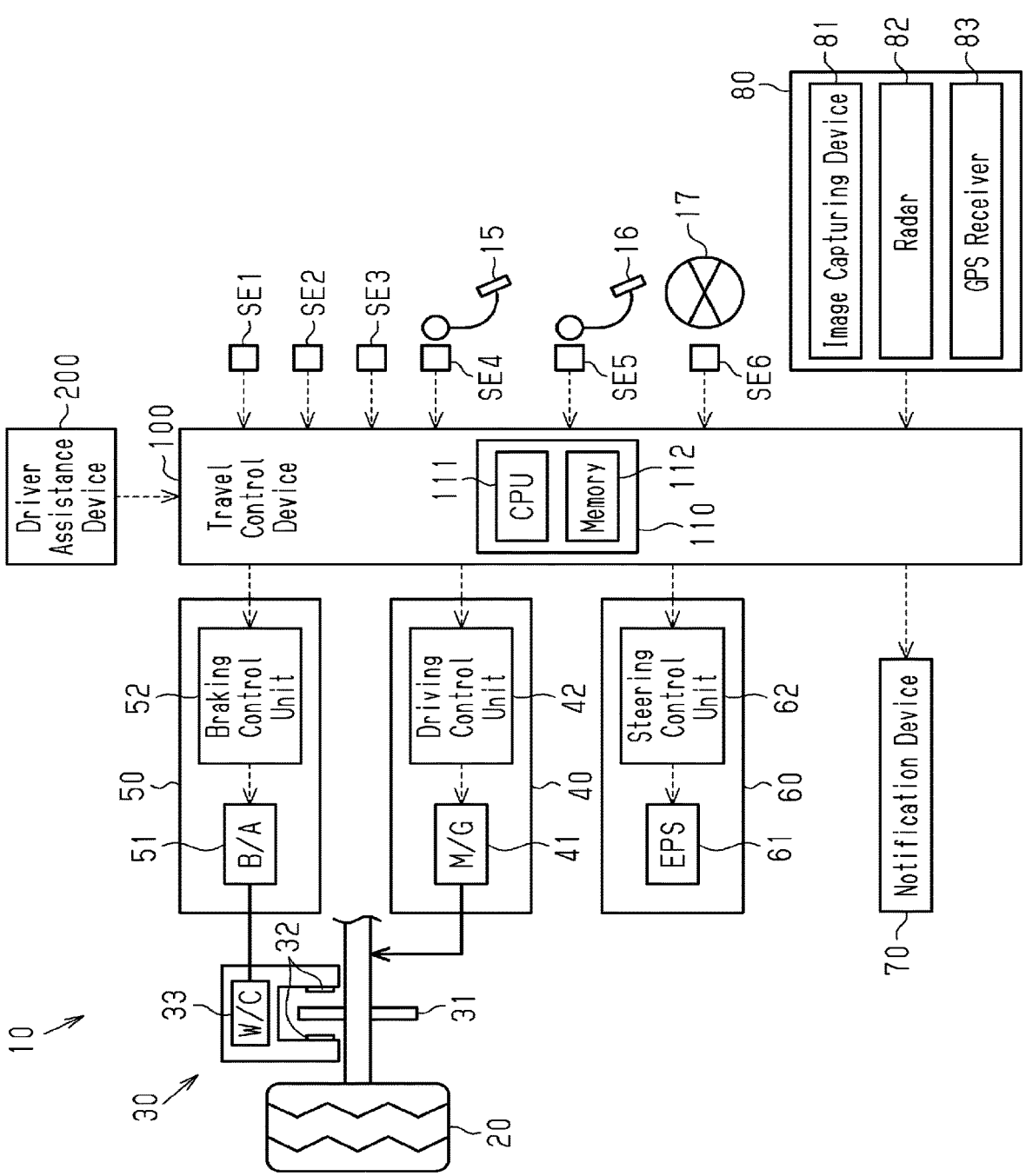
FIG. 1 is a diagram schematically showing a vehicle equipped with a travel control device, which is a vehicle control device according to an embodiment.

FIG. 1 partially illustrates a vehicle 10 equipped with a travel control device 100, which is one example of the vehicle control device.
Configuration of Vehicle The vehicle 10 includes wheels 20, friction brakes 30, of which the number is the same as that of the wheels 20, a braking device 50, a driving device 40, a steering device 60, and a notification device 70.

The friction brakes 30 are braking mechanisms that generate frictional braking force at the wheels 20. Each friction brake 30 includes a rotor 31, which rotates integrally with the wheel 20, frictional material 32, and a wheel cylinder 33. When a WC pressure, which is liquid pressure in the wheel cylinder 33, is produced, the frictional material 32 is pressed against the rotor 31. This applies frictional braking force to the wheel 20. As the WC pressure increases, the force with which the frictional material 32 is pressed against the rotor 31 increases. Accordingly, the frictional braking force is increased.

The braking device 50 includes a brake actuator 51, which supplies brake fluid to the wheel cylinders 33 of the friction brakes 30, and a braking control unit 52, which controls the brake actuator 51. The braking control unit 52 controls the brake actuator 51 so as to adjust the WC pressure in the wheel cylinders 33. That is, the braking control unit 52 adjusts the frictional braking force of the vehicle 10 by adjusting the WC pressure in the wheel cylinders 33. The frictional braking force of the vehicle 10 is the sum of the frictional braking forces applied to the wheels 20. In the present embodiment, the brake actuator 51 is an example of "an actuator" related to traveling of the vehicle, and braking control unit 52 is an example of "a control unit for an actuator". The brake actuator 51 and the braking control unit 52 are also examples of "vehicle on-board devices".

The driving device 40 includes a motor-generator 41, which is a drive source of the vehicle 10, and a driving control unit 42, which controls the motor-generator 41. Driving force of the motor-generator 41 is transmitted to the wheels 20, so that the vehicle 10 travels. Therefore, the motor-generator 41 is an example of "an actuator" related to traveling of the vehicle, and the driving control unit 42 is an example of "a control unit for an actuator". The motor-generator 41 and the driving control unit 42 are also examples of "vehicle on-board devices".

The steering device 60 includes a steering actuator 61, which adjusts a steered angle of the wheels 20 and a steering control unit 62, which controls the steering actuator 61. When the steered angle of the wheels 20 is adjusted by an output of the steering actuator 61, the vehicle 10 turns. Therefore, the steering actuator 61 is an example of "an actuator" related to traveling of the vehicle, and the steering control unit 62 is an example of "a control unit for an actuator". The steering actuator 61 and the steering control unit 62 are also examples of "vehicle on-board devices".

The notification device 70 notifies an occupant of the vehicle 10 of information output by the travel control device 100. As will be discussed in detail below; the travel control device 100 has a function of determining whether there is an anomaly in a vehicle on-board device. When the travel control device 100 determines that there is an anomaly in any one of the vehicle on-board devices, the notification device 70 notifies occupants of information related to the vehicle on-board device having the anomaly. The notification device 70 may include a display screen or may include a device that outputs sound such as a speaker or a buzzer.
Detection System of Vehicle The vehicle 10 includes a detection system that detects a state of the vehicle 10, which changes during traveling of the vehicle 10. The detection system is an example of "a vehicle on-board device".

The detection system includes multiple sensors that detect a vehicle state that may change during traveling of the vehicle 10. For example, the detection system includes a wheel speed sensor SE1, a longitudinal acceleration sensor SE2, a yaw rate sensor SE3, an accelerator depression amount sensor SE4, a brake depression amount sensor SE5, and a steering angle sensor SE6. The wheel speed sensor SE1 detects a rotation speed of a wheel 20 as a wheel speed Vw. The longitudinal acceleration sensor SE2 detects a longitudinal acceleration Gs of the vehicle 10. The yaw rate sensor SE3 detects a yaw rate Yr of the vehicle 10. The accelerator depression amount sensor SE4 detects an accelerator depression amount AC, which is an operated amount of the accelerator pedal 15 by the driver. The brake operated amount sensor SE5 detects a brake depression amount BP, which is an operated amount of a brake pedal 16 by the driver. The steering angle sensor SE6 detects a steering angle Str of the steering wheel 17 operated by the driver. The various sensors SE1 to SE6 output signals corresponding to detection results to the travel control device 100.

The detection system includes a vehicle exterior monitoring system 80. The vehicle exterior monitoring system 80 monitors the situation outside the vehicle 10. For example, the vehicle exterior monitoring system 80 includes an image capturing device 81, a radar 82, and a GPS receiver 83. The image capturing device 81 captures images of outside of the vehicle 10. The radar 82 detects the distance between the vehicle 10 and another vehicle, the distance from the vehicle 10 to an obstacle, the distance from the vehicle 10 to a pedestrian, and the like. The GPS receiver 83 acquires the position of the vehicle 10.

The state of the vehicle 10 can be detected based on the information acquired by the vehicle exterior monitoring system 80. For example, a case will be considered in which a non-moving structure such as a traffic light or a traffic sign is included in an image captured by the image capturing device 81. In this case, by analyzing images captured at predetermined intervals, changes in the positional relationship between the vehicle 10 and the structure can be detected in a time series. The traveling speed, the acceleration, the yaw rate, and the like of the vehicle 10 can be detected as the state of the vehicle 10 based on the changes over time in the positional relationship between vehicle 10 and the structure. In addition, for example, the traveling speed, the acceleration, the yaw rate, and the like of the vehicle 10 can be detected as the state of the vehicle 10 based on temporal changes in the position of the vehicle 10 received by the GPS receiver 83.

Control Configuration of Vehicle

The vehicle 10 includes a driver assistance device 200 in addition to the travel control device 100.

(A1) Driver Assistance Device 200

The driver assistance device 200 includes a CPU and a memory. The memory stores control programs executed by the CPU.

The driver assistance device 200 functions as several types of application requesting units by causing the CPU to execute control programs. The application requesting units are functional units that perform a driver assistance function for assisting the driver in driving the vehicle 10. The application requesting units output request values for performing the driver assistance function to the travel control device 100.

In the present embodiment, the driver assistance function adjusts the longitudinal acceleration of the vehicle 10. Examples of such driver assistance functions include adaptive cruise control, lane keep assist, and autonomous driving.

For example, when the application requesting unit requests acceleration or deceleration of the vehicle 10, the request value output by the application requesting unit is a request value related to the longitudinal acceleration of the vehicle 10. The request value related to the longitudinal acceleration is, for example, a request value of the longitudinal acceleration or a request value of a longitudinal force of the vehicle 10. The longitudinal force is a force that adjusts acceleration and deceleration of the vehicle 10. For example, when the vehicle 10 is accelerated, the longitudinal force has a positive value. On the other hand, when the vehicle 10 is decelerated, the longitudinal force has a negative value.

When the application requesting unit requests turning of the vehicle 10, the request value output by the application requesting unit is a request value related to a yaw rate of the vehicle 10. The request value related to the yaw rate is, for example, a request value of the yaw rate or a request value of the of the lateral acceleration.

(A2) Travel Control Device 100

The travel control device 100 includes processing circuitry 110. The processing circuitry 110 includes a CPU 111 and a memory 112. The memory 112 stores multiple control programs executed by the CPU 111. The CPU 111 corresponds to "an execution device" that executes control programs.

Figure 2:
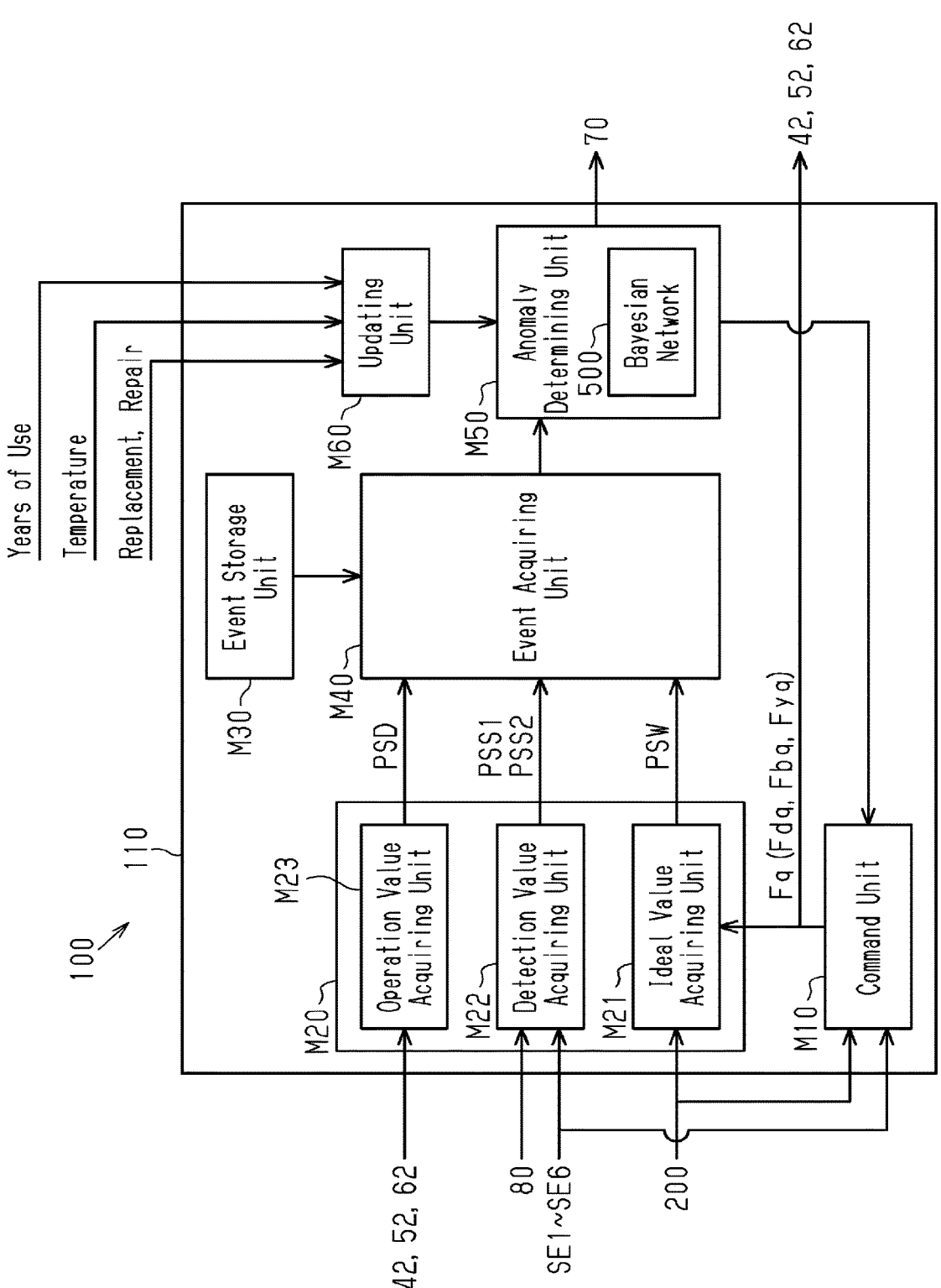
FIG. 2 is a block diagram showing a functional configuration of the travel controller shown in FIG. 1.

As shown in FIG. 2, when the CPU 111 executes the control programs, the travel control device 100 functions as a command unit M10, a state quantity acquiring unit M20, an event storage unit M30, an event acquiring unit M40, and an anomaly determining unit M50. The travel control device 100 also functions as an updating unit M60.

The command unit M10 generates a command value Fq for the actuator 41, 51, 61 based on a request from the driver assistance device 200, that is, a request from the application requesting unit. Then, the command unit M10 causes the vehicle 10 to travel by outputting the command value Fq to the control unit 42, 52, 62 for the actuator.

When deceleration of the vehicle 10 is requested by the application requesting unit, the command unit M10 generates a command value Fbq of the braking force as the command value Fq, and outputs the command value Fbq to the braking control unit 52. In this case, the braking control unit 52 operates the brake actuator 51 based on the command value Fbq. This causes the vehicle 10 to decelerate in response to the request for deceleration from the application requesting unit.

When acceleration of the vehicle 10 is requested by the application requesting unit, the command unit M10 generates a command value Fdq of the driving force as the command value Fq, and outputs the command value Fdq to the driving control unit 42. In this case, the driving control unit 42 operates the motor-generator 41 based on the command value Fdq. This causes the vehicle 10 to accelerate in response to the request for acceleration from the application requesting unit.

When turning of the vehicle 10 is requested by the application requesting unit, the command unit M10 generates a command value Fyq of the yaw rate as the command value Fq, and outputs the command value Fyq to the steering control unit 62. In this case, the steering control unit 62 operates the steering actuator 61 based on the command value Fyq. This causes the vehicle 10 to turn in response to the request for turning from the application requesting unit.

As will be discussed in detail below, the anomaly determining unit M50 determines whether there is an anomaly in a vehicle on-board device. The command unit M10 reflects a determination result of the anomaly determining unit M50 on the command value Fq.

When the control unit 42, 52, 62 operates the actuator 41, 51, 61 according to the command value Fq from the command unit M10 as described above, the control unit 42, 52, 62 outputs an operation amount of the actuator 41, 51, 61 or a parameter correlated with the operation amount to the travel control device 100.

The state quantity acquiring unit M20 acquires a vehicle state quantity when the vehicle 10 travels according to the command value Fq generated by the command unit M10. The vehicle state quantity is a value indicating a state of the vehicle 10 during traveling. The vehicle state quantity includes, for example, a yaw rate, a traveling speed, a longitudinal acceleration, and a lateral acceleration of the vehicle 10.

The state quantity acquiring unit M20 includes an ideal value acquiring unit M21, a detection value acquiring unit M22, and an operation value acquiring unit M23.

The ideal value acquiring unit M21 acquires a vehicle state quantity ideal value PSW, which is a value of the vehicle state quantity at the time when the actuator 41, 51, 61 operates normally according to the command value Fq. Normal operation of an actuator refers to functioning of the actuator as designed. For example, if the vehicle state quantity is the yaw rate, the ideal value acquiring unit M21 acquires, as the vehicle state quantity ideal value PSW, an estimated value of the yaw rate, assuming that the actuator 41, 51, 61 operates normally. The estimated value of the yaw rate can be derived based on specifications of the vehicle 10, for example, the stability factor, the weight of the vehicle 10, the wheel base length, and the like.

The detection value acquiring unit M22 acquires vehicle state quantity detection values, which are values of the vehicle state quantity based on a detection result of the detection system. In the present embodiment, the detection value acquiring unit M22 acquires a first vehicle state quantity detection value PSS1 and a second vehicle state quantity detection value PSS2 as the vehicle state quantity detection values. The first vehicle state quantity detection value PSS1 is one of the detection values of the vehicle on-board sensors SE1 to SE6 in the detection system or a value of the vehicle state quantity calculated from the detection values. The value of the vehicle state quantity calculated from the detection values is, for example, a traveling speed Vs of the vehicle 10. The traveling speed Vs is calculated based on at least one of wheel speeds Vw of the wheels 20.

The second vehicle state quantity detection value PSS2 is a value of the vehicle state quantity derived based on information acquired by the vehicle exterior monitoring system 80 of the detection system. For example, the detection value acquiring unit M22 acquires, as the second vehicle state quantity detection value PSS2, a value of the vehicle state quantity derived by analyzing images captured by the image capturing device 81 at specified time intervals or by acquiring temporal changes in the position of the vehicle 10 received by the GPS receiver 83.

The operation value acquiring unit M23 acquires a vehicle state quantity operation value PSD, which is a value of the vehicle state quantity corresponding to an operation amount of the actuator 41, 51, 61 operated based on a command from the command unit M10. In the present embodiment, when the actuator 41, 51, 61 operates based on a command from the command unit M10, the control unit 42, 52, 62 for the actuator 41, 51, 61 outputs, to the travel control device 100, the actual operation amount of the actuator 41, 51, 61 or a parameter correlated with the actual operation amount. This allows the travel control device 100 to acquire the actual operation amount of the actuator 41, 51, 61. Therefore, the operation value acquiring unit M23 derives a value of the vehicle state quantity based on the actual operation amount of the actuator 41, 51, 61 as the vehicle state quantity operation value PSD. For example, when the motor-generator 41 is operating, the operation value acquiring unit M23 acquires, as the vehicle state quantity operation value PSD, the longitudinal acceleration of the vehicle 10 derived based on the actual operation amount of the motor-generator 41. The actual operation amount of the motor-generator 41 is, for example, a rotation amount of a rotor of the motor-generator 41.

The event storage unit M30 stores multiple events that can occur when any of the vehicle on-board devices is not functioning normally. Contents stored in the event storage unit M30 will be discussed below.

The event acquiring unit M40 compares multiple values of the vehicle state quantity acquired by the state quantity acquiring unit M20. The event acquiring unit M40 then acquires an event corresponding to the result of the comparison from among the multiple events stored in the event storage unit M30. A method of acquiring an event will be discussed below.

The anomaly determining unit M50 determines whether there is an anomaly in a vehicle on-board device based on the event acquired by the event acquiring unit M40. In the present embodiment, the anomaly determining unit M50 uses, in the determination, a Bayesian network 500 that includes, as a node, the occurrence probability of the event acquired by the event acquiring unit M40. The Bayesian network 500 receives the event acquired by the event acquiring unit M40 as an input and outputs an anomaly occurrence probability XA, which is the probability of the occurrence of an anomaly in a vehicle on-board device.

Then, the anomaly determining unit M50 determines whether there is an anomaly in the vehicle on-board device based on the anomaly occurrence probability XA output from the Bayesian network 500.

When determining that there is an anomaly in the vehicle on-board device, the anomaly determining unit M50 causes the notification device 70 to notify the occupants of the vehicle 10 of the fact that there is an anomaly in the vehicle on-board device.

The updating unit M60 performs Bayesian updating of the Bayesian network 500 based on the years of use of the vehicle 10 or information correlated with the years of use of the vehicle 10. The updating unit M60 also performs Bayesian updating of the Bayesian network 500 according to changes in the temperature of the vehicle on-board device. Furthermore, the updating unit M60 performs Bayesian updating of the Bayesian network 500 when the vehicle on-board device is replaced or when the vehicle on-board device is repaired.

Multiple Events

Figure 3:
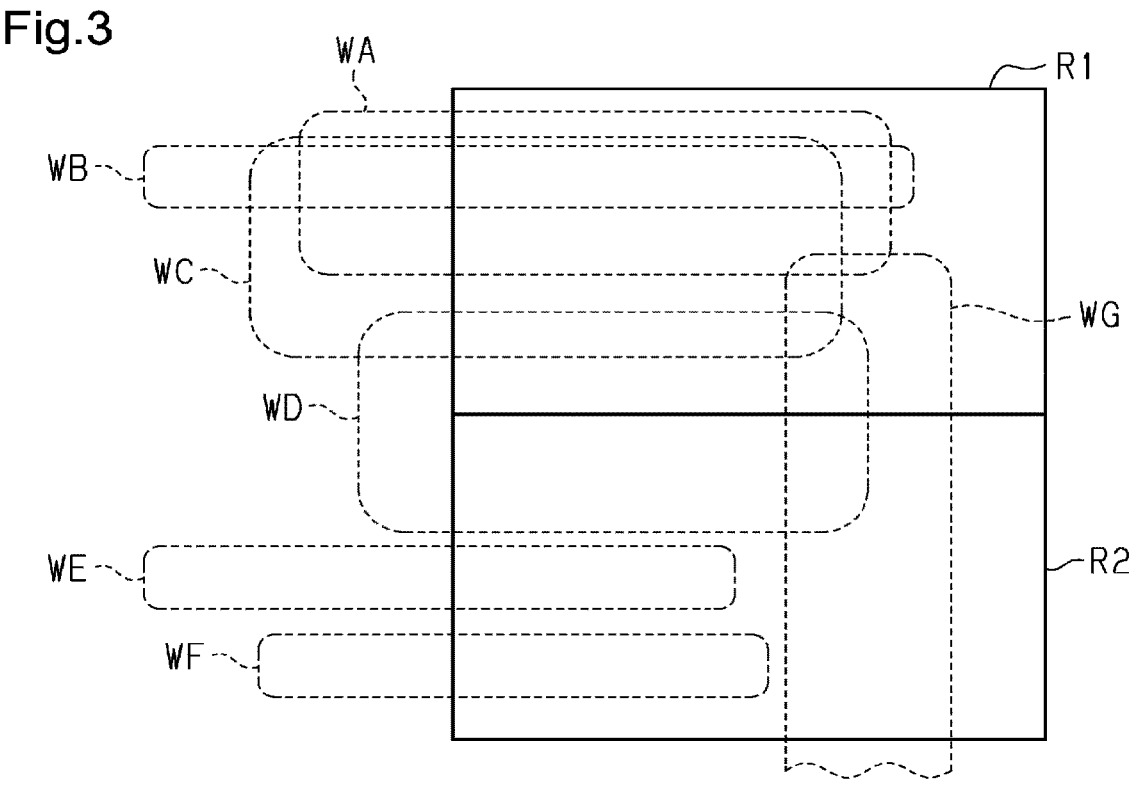
FIG. 3 is a diagram showing events stored in the travel control device shown in FIG. 1.

With reference to FIG. 3, multiple events stored in the event storage unit M30 will be described. The events mentioned here include, for example, the following events.

Event in which the detection value of a sensor deviates from an anticipated value.

Event in which the operation amount of an actuator deviates from an anticipated operation amount.

Event in which a vehicle, an obstacle, or a pedestrian around the vehicle 10 cannot be accurately recognized even if images captured by the image capturing device 81 of the vehicle exterior monitoring system 80 are analyzed.

The example shown in FIG. 3 provides seven events WA, WB, WC, WD, WE, WF, and WG. For example, the seven events WA to WG are events that can occur when an anomaly occurs in vehicle on-board devices related to operation of the steering actuator 61 based on a command from the command unit M10. In the present embodiment, the vehicle on-board devices related to the operation of the steering actuator 61 based on the command from the command unit M10 are the steering actuator 61 and the steering control unit 62.

A first region R1 in FIG. 3 is a region indicating that there is an anomaly in the steering actuator 61. Accordingly, the outside of the first region R1 is a region indicating that there is no anomaly in the steering actuators 61. A second region R2 in FIG. 3 is a region indicating that there is an anomaly in the steering control unit 62. Accordingly, the outside of the second region R2 is a region indicating that there is no anomaly in the steering control unit 62.

A first event WA, a second event WB, and a third event WC may each occur regardless of whether there is an anomaly in the steering actuator 61 or whether the steering actuator 61 is functioning normally. However, none of the first event WA, the second event WB, and the third event WC occurs when there is an anomaly in the steering control unit 62.

A fourth event WD may occur regardless of whether there is an anomaly in at least one of the steering actuator 61 and the steering control unit 62 or whether both of the steering actuator 61 and the steering control unit 62 are functioning normally.

A fifth event WE and a sixth event WF may occur regardless of whether there is an anomaly in the steering control unit 62 or whether the steering control unit 62 is functioning normally. However, neither the fifth event WE nor the sixth event WF occurs when there is an anomaly in the steering actuator 61.

A seventh event WG may occur when there is an anomaly in at least one of the vehicle on-board devices. However, the seventh event WG does not occur when all of the multiple vehicle on-board devices are functioning normally.

Method of Acquiring Event

A method of acquiring events will be described with reference to FIG. 4.

The event acquiring unit M40 acquires an event from multiple events including the events WA to WG stored in the event storage unit M30. At this time, the event acquiring unit M40 performs a preliminary determining process, which uses two of the values of the vehicle state quantity acquired by the state quantity acquiring unit M20.

The two values of the vehicle state quantity used in the preliminary determining process are selected according to a vehicle on-board device subject to anomaly determination. For example, when an actuator is subject to the anomaly determination, one of the first vehicle state quantity detection value PSS1 and the second vehicle state quantity detection value PSS2, and the vehicle state quantity operation value PSD, which is derived based on the actual operation amount of the actuator are preferably selected. Further, for example, when the vehicle exterior monitoring system 80 is subject to the anomaly determination, the first vehicle state quantity detection value PSS1 and the second vehicle state quantity detection value PSS2 are preferably selected. In addition, for example, when a control unit for an actuator is subject to the anomaly determination, the vehicle state quantity ideal value PSW and the vehicle state quantity operation value PSD are preferably selected.

Figure 4:
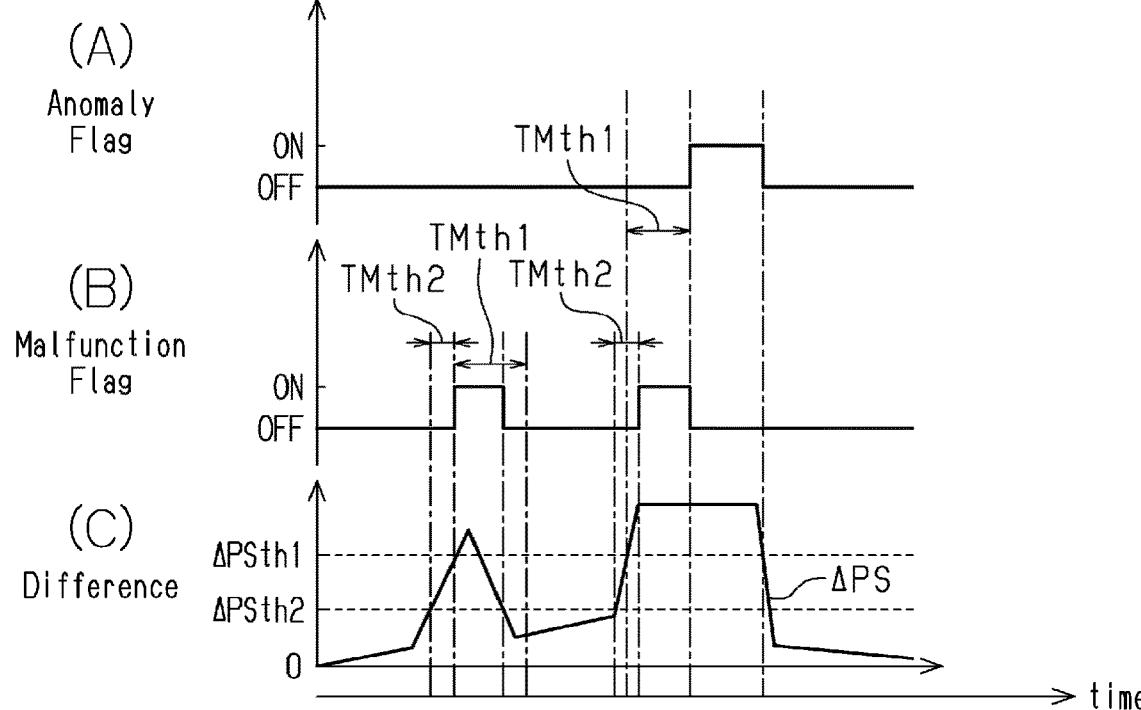
FIG. 4 is a timing diagram showing a state of a flag when a difference between two values of a vehicle state quantity of the vehicle shown in FIG. 1 changes.

As shown in part (C) of FIG. 4, in the preliminary determining process, the event acquiring unit M40 derives a difference between the two values of the vehicle state quantity selected as described above, that is, a difference ΔPS between a first value of the vehicle state quantity and a second value of the vehicle state quantity. In a case in which the difference ΔPS is greater than or equal to a first difference determination value ΔPSth1, the event acquiring unit M40 determines that there is a possibility of an anomaly in the vehicle on-board device subject to the anomaly determination. To be more specific, when the duration of the state in which the difference ΔPS is greater than or equal to the first difference determination value ΔPSth1 exceeds a first determination time TMth1, the event acquiring unit M40 determines that there is a possibility of an anomaly in the vehicle on-board device subject to the anomaly determination. When it is determined that there is a possibility of an anomaly in the vehicle on-board device as described above, the event acquiring unit M40 sets the anomaly flag FLG1 to the ON state as illustrated in part (A) of FIG. 4. When the difference ΔPS is less than the first difference determination value ΔPSth1, the event acquiring unit M40 sets the anomaly flag FLG1 to the OFF state.

In the preliminary determining process, when the difference ΔPS is less than the first difference determination value ΔPSth1, the event acquiring unit M40 determines whether the difference ΔPS is greater than or equal to a second difference determination value ΔPSth2. The second difference determination value ΔPSth2 is set to a value smaller than the first difference determination value ΔPSth1. When the difference ΔPS is less than the first difference determination value ΔPSth1 and is greater than or equal to the second difference determination value ΔPSth2, the event acquiring unit M40 determines that there is a possibility of a malfunction in the vehicle on-board device subject to the anomaly determination. To be more specific, when the duration of the state in which the difference ΔPS is less than the first difference determination value ΔPSth1 and greater than or equal to the second difference determination value ΔPSth2 exceeds a second determination time TMth2, the event acquiring unit M40 determines that there is a possibility of a malfunction in the vehicle on-board device subject to the anomaly determination. The second determination time TMth2 may be the same as or different from the first determination time TMth1. When determining that there is a possibility of a malfunction in the vehicle on-board device, the event acquiring unit M40 sets a malfunction flag FLG2 to the ON state as illustrated in part (B) of FIG. 4.

When the difference ΔPS is less than the second difference determination value ΔPSth2 in a case in which a malfunction flag FLG2 is in the ON state, the event acquiring unit M40 sets the malfunction flag FLG2 to the OFF state. When a condition for setting the anomaly flag FLG1 to the ON state is met in a case in which the malfunction flag FLG2 is in the ON state, the event acquiring unit M40 sets the malfunction flag FLG2 to the OFF state and sets the anomaly flag FLG1 to the ON state.

The event acquiring unit M40 executes an event selecting process for acquiring an event corresponding to the result of the preliminary determining process from among multiple events including the events WA to WG. For example, when the vehicle on-board device subject to the anomaly determination is the steering actuator 61 and the anomaly flag FLG1 is set to the ON state, the event acquiring unit M40 acquires the first event WA in the event selecting process. Also, when the vehicle on-board device subject to the anomaly determination is the steering actuator 61 and the malfunction flag FLG2 is set to the ON state, the event acquiring unit M40 acquires an event other than the first event WA, for example, the third event WC, in the event selecting process. The number of events acquired by the event acquiring unit M40 in the event selecting process is not limited to one. That is, depending on the determination result, the event acquiring unit M40 may acquire two or more events from among multiple events including the events WA to WG.

Bayesian Network

The Bayesian network 500 uses the probabilities of the occurrence of multiple events including the events WA to WG as nodes, and uses the relationships between the probabilities as links. The probabilities of the occurrence of multiple events including the events WA to WG and the relationships between the respective probabilities are set in advance.

Figure 5:
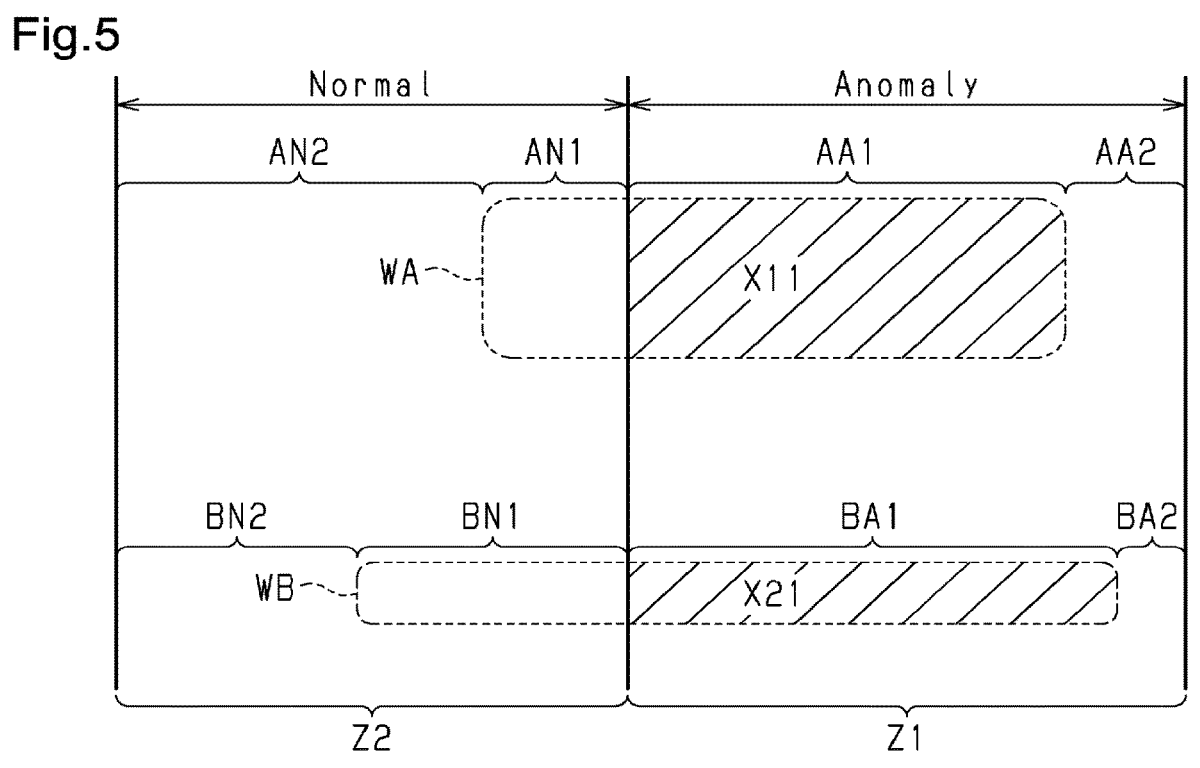

FIG. 5 is a diagram showing the probability of the occurrence of the first event WA and the probability of the occurrence of the second event WB. As shown in FIG. 5, in a situation in which the steering actuator 61 has an anomaly, the probability of the occurrence of the first event WA is AA1 (%), whereas the probability of the nonoccurrence of the first event WA is AA2 (%). On the other hand, in a situation in which the steering actuator 61 is functioning normally, the probability of the occurrence of the first event WA is AN1 (%), whereas the probability of the nonoccurrence of the first event WA is AN2 (%).

Likewise, in a situation in which the steering actuator 61 has an anomaly, the probability of the occurrence of the second event WB is BA1 (%), whereas the probability of the nonoccurrence of the second event WB is BA2 (%). On the other hand, in a situation in which the steering actuator 61 is functioning normally, the probability of the occurrence of the second event WB is BN1 (%), whereas the probability of the nonoccurrence of the second event WB is BN2 (%).

The anomaly occurrence probability XA of the steering actuator 61 output from the Bayesian network 500 when the first event WA and the second event WB are acquired will now be described.

The occurrence probability X1 of the first event WA is calculated by the following relational expression (Expression 1). In the relational expression (Expression 1), Z1 is the probability of the occurrence of anomaly in the steering actuator 61, and Z2 is the probability of the nonoccurrence of an anomaly in the steering actuator 61. Z2 is a value obtained by subtracting Z1 from 100(%).

[Expression 1]

$$X1 = AA1 \cdot Z1 + AN1 \cdot Z2 \qquad \text{(Expression 1)}$$

A probability X11 of the occurrence of an anomaly in the steering actuator 61 when the first event WA is occurring is calculated by the following relational expression (Expression 2).

[Expression 2]

$$X11 = \frac{AA1}{X1} \cdot Z1 \qquad \text{(Expression 2)}$$

The occurrence probability X2 of the second event WB is calculated by the following relational expression (Expression 3).

[Expression 3]

$$X2 = BA1 \cdot Z1 + BN1 \cdot Z2 \qquad \text{(Expression 3)}$$

A probability X21 of the occurrence of an anomaly in the steering actuator 61 when the second event WB is occurring is calculated by the following relational expression (Expression 4).

[Expression 4]

$$X21 = \frac{BA1}{X2} \cdot Z1 \qquad \text{(Expression 4)}$$

A probability X3 of the occurrence of an anomaly in the steering actuator 61 when the first event WA and the second event WB are both occurring is calculated by the following relational expression (Expression 5).

[Expression 5]

$$X3 = \frac{AA1 \cdot BA1 \cdot Z1}{AA1 \cdot BA1 \cdot Z1 + AN1 \cdot BN1 \cdot Z2} \qquad \text{(Expression 5)}$$

That is, the probability X3 is output from the Bayesian network 500 as the anomaly occurrence probability XA of the steering actuator 61.

Bayesian Updating of Bayesian Network (B1) Bayesian Updating According to Years of Use of Vehicle As the years of use of the vehicle 10 increases, the characteristics of the vehicle on-board devices change over time. In the case of an actuator, the characteristics of the actuator change due to wear of components of the actuator or a decrease in durability of the components. In the case of a control unit and a sensor, the control unit becomes more likely to generate heat, and the detection accuracy of the sensor is changed due to oxidation of components or the like.

In this regard, the updating unit M60 performs Bayesian updating of the Bayesian network 500 according to the years of use of the vehicle 10. Specifically, the updating unit M60 increases the probabilities that multiple events including the events WA to WG occur when there is an anomaly in a vehicle on-board device such that the anomaly occurrence probability XA of the vehicle on-board device output from the Bayesian network 500 increases as the years of use increases. For example, in the case of the first event WA, the updating unit M60 increases AA1 (%), which is the probability of the occurrence of the first event WA, in a situation in which there is an anomaly in the steering actuator 61.

(B2) Bayesian Updating According to Temperature of Vehicle On-Board Device

Some vehicle on-board devices have varying susceptibilities to anomalies depending on temperature. For example, some vehicle on-board devices become more prone to failure if a situation in which the temperatures of the vehicle on-board devices are high continue. Therefore, the updating unit M60 performs Bayesian updating of the Bayesian network 500 according to changes in the temperature of the vehicle on-board device. Specifically, the updating unit M60 adjusts the probabilities of the occurrences of multiple events including the events WA to WG when an anomaly occurs in the vehicle on-board device such that the anomaly occurrence probability XA of the vehicle on-board device output from the Bayesian network 500 is higher when the temperature of the vehicle on-board device is within a temperature range in which the vehicle on-board device is likely to have an anomaly than when the temperature of the vehicle on-board device is not in the temperature range.

(B3) Bayesian Updating when Vehicle On-Board Device is Replaced or Repaired

When an anomaly such as a failure occurs in a vehicle on-board device, the vehicle on-board device is replaced or repaired. A vehicle on-board device is regarded to have an anomaly when it is replaced or repaired. In this regard, when detecting that the vehicle on-board device has been replaced or repaired, the updating unit M60 adjusts the probabilities of the occurrences of multiple events including the events WA to WG when an anomaly occurs in the vehicle on-board device such that the anomaly occurrence probability XA of the vehicle on-board device output from the Bayesian network 500 increases.

Figure 6:
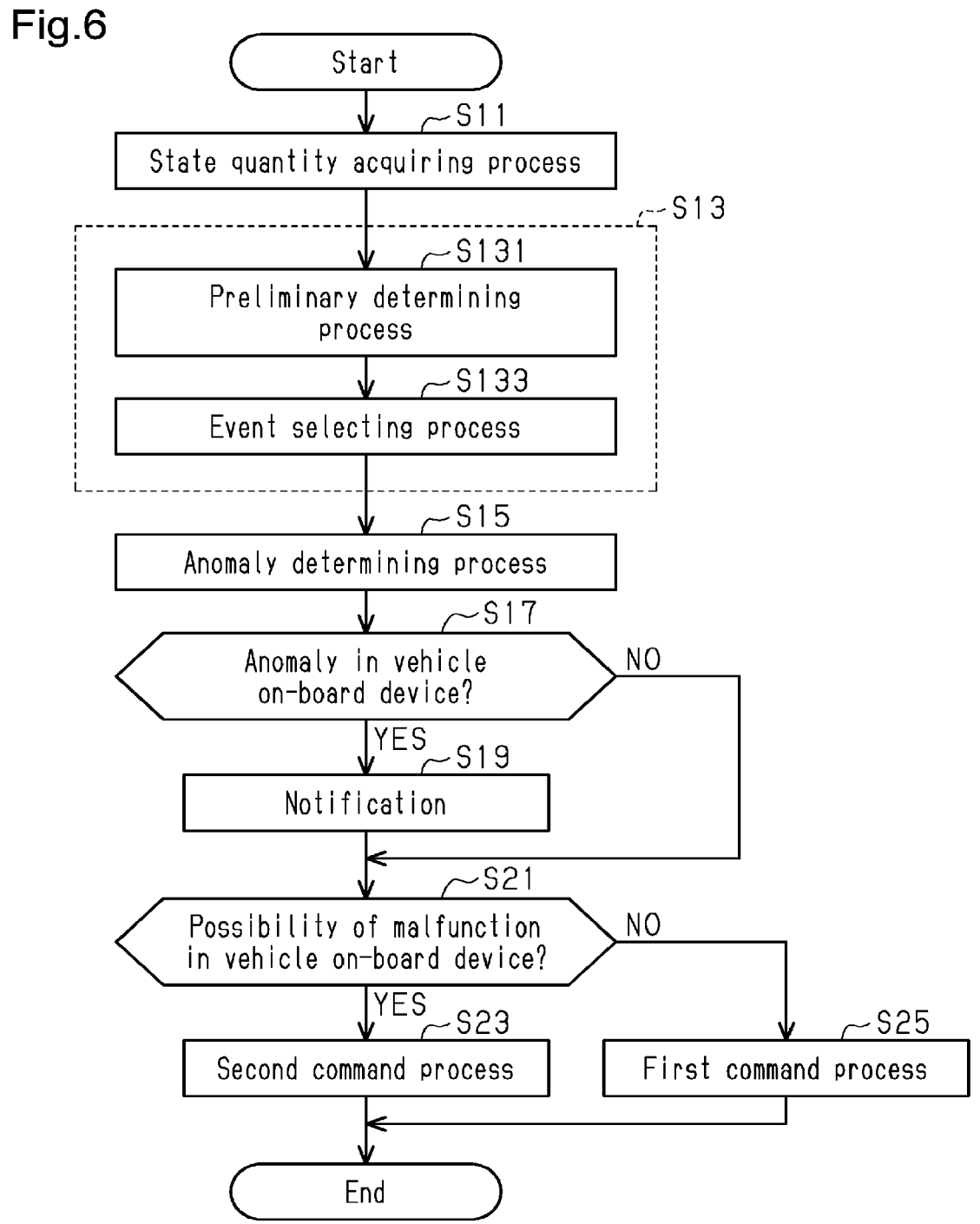
FIG. 6 is a flowchart illustrating a processing routine executed by processing circuitry of the travel control device shown in FIG. 1.

Flow of Process for Determining Occurrence of Anomaly in Vehicle On-Board Device Referring to FIG. 6, a description will be given of a processing routine executed by the processing circuitry 110 of the travel control device 100 when it is determined whether there is an anomaly in a vehicle on-board device. The processing circuitry 110 is caused to execute this processing routine by the execution of a vehicle control program by the CPU 111. The vehicle control program is one of the control programs stored in the memory 112 of the processing circuitry 110. Therefore, it can also be said that the processes of this processing routine are executed by the CPU 111, which is the execution device.

When the vehicle 10 travels through the operations of the actuators 41, 51, 61 based on commands from the travel control device 100, the processing circuitry 110 repeatedly executes this processing routine at prescribed control cycles.

In step S11 of the present processing routine, the processing circuitry 110 functions as the state quantity acquiring unit M20 to acquire the vehicle state quantity ideal value PSW, the first vehicle state quantity detection value PSS1, the second vehicle state quantity detection value PSS2, and the vehicle state quantity operation value PSD. In the present embodiment, the process of step S11 executed by the processing circuitry 110 functioning as the state quantity acquiring unit M20 corresponds to "a state quantity acquiring process".

Subsequently, in step S13, the processing circuitry 110 functions as the event acquiring unit M40 to acquire an event from among multiple events including the events WA to WG, which can occur when any of the vehicle on-board devices is not functioning normally. In the present embodiment, the process of step S13 executed by the processing circuitry 110 functioning as the state quantity acquiring unit M20 corresponds to "an event acquiring process".

The process of step S13 includes the preliminary determining process of step S131 and the event selecting process of step S133.

In the preliminary determining process (S131), the processing circuitry 110 compares the first value of the vehicle state quantity and the second value of the vehicle state quantity among the multiple values of the vehicle state quantity acquired in step S11, and determines whether there is a possibility of an anomaly in the vehicle on-board device subject to the anomaly determination. In addition, the processing circuitry 110 compares the first value of the vehicle state quantity and the second value of the vehicle state quantity, and determines whether there is a possibility of a malfunction in the vehicle on-board device subject to the anomaly determination.

Then, in the event selecting process (S133), the processing circuitry 110 selects an event corresponding to the result of the preliminary determining process (S131) from among multiple events including the events WA to WG. When both the anomaly flag FLG1 and the malfunction flag FLG2 are set to the OFF states as a result of executing the preliminary determining process, the processing circuitry 110 does not select any event.

An event acquiring process in a case in which three values of the vehicle state quantity are acquired in step S11 will be described. In this case, in the preliminary determining process (S131), the processing circuitry 110 derives a first difference ΔPS1, which is a difference between a first value of the vehicle state quantity and a second value of the vehicle state quantity among the three values of the vehicle state quantities. The processing circuitry 110 derives a second difference ΔPS2, which is a difference between the first value of the vehicle state quantity and a third value of the vehicle state quantity among the three values of the vehicle state quantities. The processing circuitry 110 derives a third difference ΔPS3, which is a difference between the second value of the vehicle state quantity and the third value of the vehicle state quantity.

Subsequently, in the event selecting process (S133), when comparing the first value of the vehicle state quantity and the second value of the vehicle state quantity and discovering that, as a result of the comparison, the first difference ΔPS1 is relatively large, the processing circuitry 110 sets the anomaly flag FLG1 or the malfunction flag FLG2 to the ON state. In this case, the processing circuitry 110 selects an event corresponding to the first difference ΔPS1 from multiple events including the events WA to WG. When comparing the first value of the vehicle state quantity and the third value of the vehicle state quantity and discovering that, as a result of the comparison, the second difference ΔPS1 is relatively large, the processing circuitry 110 sets the anomaly flag FLG1 or the malfunction flag FLG2 to the ON state. In this case, the processing circuitry 110 selects an event corresponding to the second difference ΔPS2 from multiple events including the events WA to WG. When comparing the second value of the vehicle state quantity and the third value of the vehicle state quantity and discovering that, as a result of the comparison, the third difference ΔPS3 is relatively large, the processing circuitry 110 sets the anomaly flag FLG1 or the malfunction flag FLG2 to the ON state. In this case, the processing circuitry 110 selects an event corresponding to the third difference ΔPS3 from multiple events including the events WA to WG.

In the present embodiment, the event selected by the processing circuitry 110 changes between the case in which the anomaly flag FLG1 is in the ON state and the case in which the malfunction flag FLG2 is in the ON state. The event selected when the anomaly flag FLG1 is in the ON state is referred to as an anomaly-time selected event, and the event selected when the malfunction flag FLG2 is in the ON state is referred to as a malfunction-time selected event. At this time, the probability of the occurrence of the anomaly-time selected event is higher than the probability of the occurrence of the malfunction-time selected event in a situation in which there is an anomaly in the vehicle on-board device.

When acquiring the event selected in the event selecting process (S133), the processing circuitry 110 advances the process to step S15. In step S15, the processing circuitry 110 functions as the anomaly determining unit M50 to determine whether there is an anomaly in the vehicle on-board device subject to the anomaly determination. In the present embodiment, the process of step S15 executed by the processing circuitry 110 functioning as the anomaly determining unit M50 corresponds to "an anomaly determining process". In the anomaly determining process, the processing circuitry 110 inputs the event acquired in step S13 to the Bayesian network 500 and causes the Bayesian network 500 to output the anomaly occurrence probability XA. When the anomaly occurrence probability XA is greater than or equal to a probability determination value, the processing circuitry 110 determines that there is an anomaly in the vehicle on-board device subject to the anomaly determination. When the anomaly occurrence probability XA is less than the probability determination value, the processing circuitry 110 determines that there is no anomaly in the vehicle on-board device subject to the anomaly determination. In addition, even when no event is acquired in step S13, the processing circuitry 110 determines that there is no anomaly in the vehicle on-board device subject to the anomaly determination.

In the subsequent step S17, the processing circuitry 110 determines whether the anomaly determining process has determined that there is an anomaly in the vehicle on-board device subject to the anomaly determination. If the anomaly determining process has determined that there is an anomaly in the vehicle on-board device (S17: YES), the processing circuitry 110 advances the process to step S19. If the anomaly determining process has determined that there is no anomaly in the vehicle on-board device (S17: NO), the processing circuitry 110 advances the process to step S21.

In step S19, by functioning as the anomaly determining unit M50, the processing circuitry 110 causes the notification device 70 to notify the occupants of the vehicle 10 of the fact that there is an anomaly in the vehicle on-board device subject to the anomaly determination. Then, the processing circuitry 110 advances the process to step S21.

In step S21, the processing circuitry 110 determines whether the preliminary determining process (S131) has determined that there is a possibility of a malfunction in the vehicle on-board device subject to the anomaly determination. If the preliminary determining process determines that there is a possibility of a malfunction in the vehicle on-board device (S21: YES), the processing circuitry 110 advances the process to step S23. If the preliminary determining process determines that there is no possibility of a malfunction in the vehicle on-board device (S21: NO), the processing circuitry 110 advances the process to step S25.

In step S23, the processing circuitry 110 functions as the command unit M10 to execute a second command process. In the second command process, the processing circuitry 110 generates the command value Fq. At this time, the processing circuitry 110 generates the command value Fq based on a request of the driver assistance device 200 and the detection values of the sensors SE1 to SE6. Subsequently, the processing circuitry 110 corrects the command value Fq in a direction of increasing the difference ΔPS. Then, the processing circuitry 110 outputs the corrected command value Fq to the control unit 42, 52, 62 of the actuator 41, 51, 61. Thereafter, the processing circuitry 110 temporarily ends the processing routine.

Figure 7:
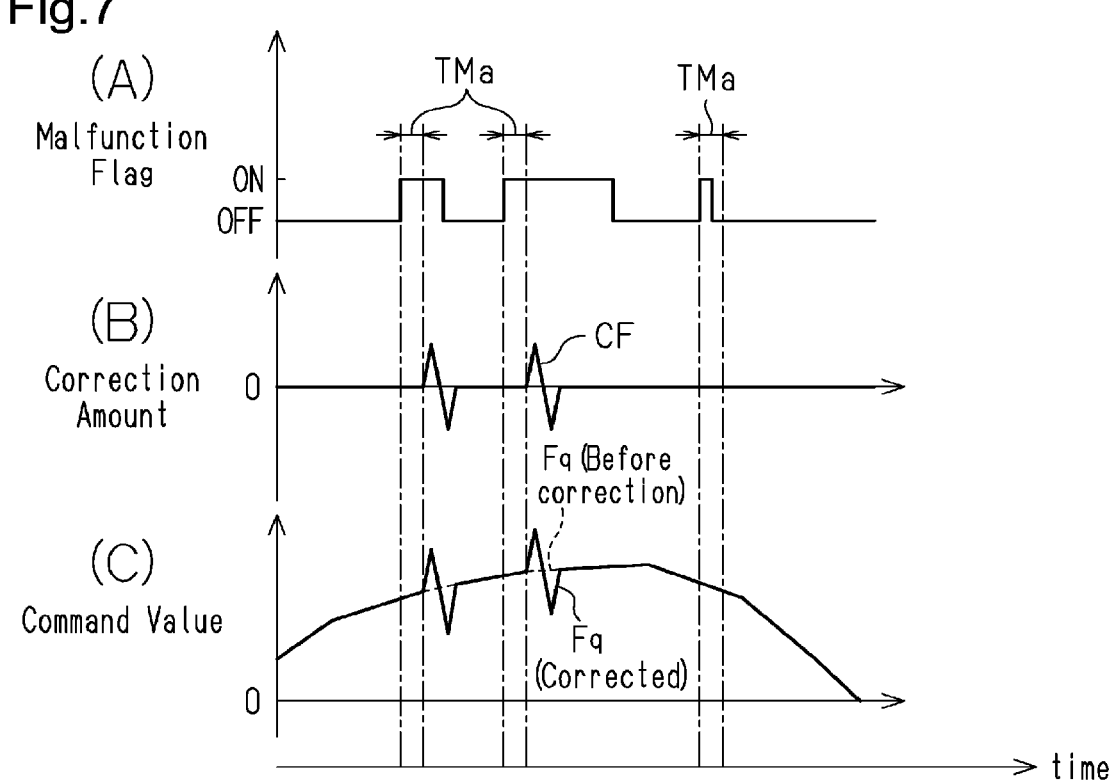
FIG. 7 is a timing diagram illustrating correction of a command value when it is determined that there is a possibility of a malfunction in a vehicle on-board device in the vehicle shown in FIG. 1.

Referring to FIG. 7, a method of correcting the command value Fq when it is determined that there is a possibility of a malfunction in a vehicle on-board device will be described in detail. As shown in part (A) of FIG. 7, the processing circuitry 110 corrects the command value Fq when the duration from a time point at which the malfunction flag FLG2 is set to the ON state reaches a prescribed time TMa. As shown in part (B) of FIG. 7, the processing circuitry 110 derives a correction amount CF of the command value Fq. At this time, the processing circuitry 110 increases the absolute value of the correction amount CF in a direction of increasing the difference ΔPS, and then changes the absolute value of the correction amount CF in a direction of reducing the difference ΔPS. As a result, the processing circuitry 110 corrects the command value Fq as indicated by the solid line in part (C) of FIG. 7. The broken line in part (C) of FIG. 7 indicates the transition of the command value Fq before correction.

When the duration of the state in which the malfunction flag FLG2 is in the ON state is less than the prescribed time TMa, the processing circuitry 110 does not correct the command value Fq. In this case, even if the malfunction flag FLG2 is set to the ON state, the correction amount CF remains 0.

Referring back to FIG. 6, in step S25, the processing circuitry 110 functions as the command unit M10 to execute a first command process. In the first command process, the processing circuitry 110 generates the command value Fq based on a request of the driver assistance device 200 and the detection values of the sensors SE1 to SE6. Then, the processing circuitry 110 outputs the command value Fq to the control unit 42, 52, 62 of the actuator 41, 51, 61. In the present embodiment, the process of step S25 also corresponds to "a command process". Thereafter, the processing circuitry 110 temporarily ends the processing routine.

Operation and Advantages of Present Embodiment

When the actuator 41, 51, 61 is operated in response to a command from the travel control device 100 so that the vehicle 10 is traveling, the vehicle state quantity ideal value PSW, the vehicle state quantity detection values PSS1, PSS2, and the vehicle state quantity operation value PSD are acquired. Then, the acquired values of the vehicle state quantity are compared. An event corresponding to the result of the comparison is acquired from among multiple events including the events WA to WG. Then, by using the Bayesian network 500, which has the occurrence probabilities of the acquired event as nodes, it is determined whether there is an anomaly in the vehicle on-board device subject to the anomaly determination. Specifically, when the acquired event is input to the Bayesian network 500, the anomaly occurrence probability XA of the on-board device subject to the anomaly determination is output from the Bayesian network 500. Based on the anomaly occurrence probability XA, it is possible to determine whether there is an anomaly in the vehicle on-board device.

In the present embodiment, multiple control devices performing equivalent determining processes do not need to be provided for the purpose of determining whether there is an anomaly in a vehicle on-board device. Therefore, it is possible to determine whether there is an anomaly in the vehicle on-board device while suppressing a cost increase of the system.

The present embodiment further has the following advantages.

(1) In the present embodiment, when the preliminary determining process determines that there is a possibility of a malfunction in the vehicle on-board device, the command value Fq is corrected in a direction of increasing the difference ΔPS. Then, the control unit operates the actuator based on the corrected command value Fq. If the correction of the command value Fq increases the difference ΔPS, the possibility that the anomaly flag FLG1 will be set to the ON state becomes higher when the preliminary determining process is executed again subsequently. Once the anomaly flag FLG1 is set to the ON state, the event to be selected from multiple events including the events WA to WG is changed. As a result, the anomaly occurrence probability XA of the vehicle on-board device output from the Bayesian network 500 increases. Therefore, it is possible to determine at an early stage if there is an anomaly in the vehicle on-board device.

In addition, when the command value Fq is corrected as described above when it is determined that there is a possibility of a malfunction in the vehicle on-board device, it is possible to monitor changes in the behavior of the vehicle 10 caused by the correction of the command value Fq. This allows for determination as to whether the vehicle on-board device can be used even if there is a malfunction in the vehicle on-board device.

(2) In the present embodiment, Bayesian updating of the Bayesian network 500 is performed according to the years of use of the vehicle 10. As a result, the anomaly determining process is executed taking into consideration changes over time of the characteristics of the vehicle on-board devices. This prevents deterioration of the determination accuracy of the anomaly determining process caused by an increase in the years of use of the vehicle 10.

(3) In the present embodiment, Bayesian updating of the Bayesian network 500 is performed according to changes in the temperature of the vehicle on-board devices. This prevents deterioration of the determination accuracy of the anomaly determining process caused by changes in the temperature of the vehicle on-board devices.

(4) In the present embodiment, when replacement or repair of the vehicle on-board device is detected, the Bayesian updating of the Bayesian network 500 is performed such that the anomaly occurrence probability XA of the replaced or repaired vehicle on-board device becomes higher. Thereafter, the determination accuracy of the anomaly determining process is increased by using the Bayesian network 500 after the Bayesian updating.

Modifications

The above-described embodiment may be modified as follows. The above-described embodiment and the following modifications can be combined as long as the combined modifications remain technically consistent with each other.

The Bayesian updating of the Bayesian network 500 does not necessarily need to be performed even when a vehicle on-board device is replaced or repaired.

Bayesian updating of the Bayesian network 500 according to the years of use of the vehicle 10 does not necessarily need to be performed.

The Bayesian updating of the Bayesian network 500 according to changes in the temperature of the vehicle on-board device does not necessarily need to be performed.

When the vehicle 10 is capable of communicating with a server located outside the vehicle 10, the server may have the function of the updating unit M60. In this case, Bayesian updating of the Bayesian network 500 can be performed by communication between the server and the vehicle 10. This configuration reduces the load on the travel control device 100 since the function as the updating unit M60 can be omitted.

When the preliminary determining process determines that there is a possibility of a malfunction of a vehicle on-board device, the command value Fq does not necessarily need to be corrected. In this case, even if it is determined that there is a possibility of a malfunction in that the vehicle on-board device, the first command process is executed instead of the second command process.

In this manner, when the second command process is not executed even if it is determined that there is a possibility of a malfunction in the vehicle on-board device, the preliminary determining process does not necessarily need to determine whether there is a possibility of a malfunction in the vehicle on-board device. In this case, only one of the first difference determination value ΔPSth1 and the second difference determination value ΔPSth2 may be used as the determination value in the preliminary determining process.

The event to be acquired does not necessarily need to be different depending on whether the malfunction flag FLG2 is in the ON state or the anomaly flag FLG1 is in the ON state. For example, a case in which the first event WA is acquired will now be described. In a situation in which there is an anomaly in the steering actuator 61, the probability AA1 of the occurrence of the first event WA is preferably increased and the probability AA2 of the nonoccurrence of the first event WA is preferably reduced in a case in which the anomaly flag FLG1 is in the ON state, as compared with a case in which the malfunction flag FLG2 is in the ON state. Also, in a situation in which the steering actuator 61 is functioning normally, the probability AN1 of the occurrence of the first event WA may be decreased when the anomaly flag FLG1 is in the ON state as compared with a case in which the malfunction flag FLG2 is in the ON state.

In the above-described embodiment, any of the set of the actuators 41, 51, 61, the set of the control units 42, 52, 62, the set of the sensors SE1 to SE6, and the vehicle exterior monitoring system 80 can be subject to the anomaly determining process, but the present disclosure is not limited thereto. For example, if the actuators 41, 51, 61 are subject to the anomaly determination, at least one of the set of the control units 42, 52, 62, the set of the sensors SE1 to SE6, and the vehicle exterior monitoring system 80 does not necessarily need to be subject to the anomaly determination. Also, for example, if the control units 42, 52, 62 are subject to the anomaly determination, at least one of the set of the actuators 41, 51, 61, the set of the sensors SE1 to SE6, and the vehicle exterior monitoring system 80 does not necessarily need to be subject to the anomaly determination. Also, for example, if the sensors SE to SE6 are subject to the anomaly determination, at least one of the set of the actuators 41, 51, 61, the set of the control units 42, 52, 62, and the vehicle exterior monitoring system 80 does not necessarily need to be subject to the anomaly determination. Also, for example, if the vehicle exterior monitoring system 80 is subject to the anomaly determination, at least one of the set of the actuators 41, 51, 61, the set of the control units 42, 52, 62, and the set of the sensors SE1 to SE6 does not necessarily need to be subject to the anomaly determination.

In the above-described embodiment, the state quantity acquiring unit M20 acquires all of the vehicle state quantity ideal value PSW, the vehicle state quantity detection values PSS1, PSS2, and the vehicle state quantity operation value PSD, but the present disclosure is not limited thereto. If two or more values of the vehicle state quantity are acquired, the state quantity acquiring unit M20 does not necessarily need to acquire some of the vehicle state quantity ideal value PSW, the vehicle state quantity detection values PSS1, PSS2, and the vehicle state quantity operation value PSD.

When the anomaly determining process determines that there is an anomaly in a vehicle on-board device, information on the vehicle on-board device in which it has been determined that there is an anomaly may be transmitted to a server outside the vehicle. The information on the vehicle on-board device includes information capable of identifying the vehicle on-board device such as the type of the vehicle on-board device.

The travel control device 100 is not limited to a device that includes a CPU and a ROM and executes software processing. That is, the travel control device 100 may be configured to include processing circuitry of any one of the following types (a) to (c).

(a) Processing circuitry including one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) Processing circuitry including one or more dedicated hardware circuits that execute various processes. The dedicated hardware circuits include, for example, an application specific integrated circuit (ASIC) and a field programmable gate array (FPGA).

(c) Processing circuitry including a processor that executes part of various processes according to programs and a dedicated hardware circuit that executes the remaining processes.

The vehicle 10 may be a hybrid electric vehicle including an engine in addition to the motor-generator 41 as a drive source, or may be a vehicle including only an engine as the drive source.

In the present disclosure, "at least one of A and B" means "only A, only B, or both A and B." For multiple elements listed with "and" (A, B, . . . ), "at least one of the multiple elements" means "only one element selected from the multiple elements, or any two or more elements selected from the multiple elements." Similarly, "at least two of the multiple elements" means "only two elements selected from the multiple elements, or any three or more elements selected from the multiple elements."

The invention claimed is:

1. A vehicle control device employed in a vehicle, the vehicle including a vehicle on-board device that includes an actuator related to traveling of the vehicle, a control unit for the actuator, and a detection system that detects a state of the vehicle that changes due to operation of the actuator, the vehicle control device comprising:

processing circuitry configured to:
  generate a command value for the actuator based on a request related to a driver assistance function from an application requesting unit, and cause the vehicle to travel by outputting the command value to the control unit,
  acquire at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator,
  store multiple events that can occur when the vehicle on-board device is not functioning normally,
  compare at least two values of the acquired vehicle state quantity and acquire an event corresponding to a result of the comparison from among the multiple events,
  determine whether there is an anomaly in the vehicle on-board device by using a Bayesian network that includes, as a node, an occurrence probability of the acquired event,
  execute a preliminary determining process that:
    determines that there is a possibility of an anomaly in the vehicle on-board device when a difference between a first value of the vehicle state quantity and a second value of the vehicle state quantity among the at least two values of the acquired vehicle state quantity is greater than or equal to a first difference determination value, and
    determines that there is a possibility of a malfunction in the vehicle on-board device when the difference is less than the first difference determination value and is greater than or equal to a second difference determination value, which is smaller than the first difference determination value,
  acquire, from among the multiple events, an event corresponding to a result of the preliminary determining process, and

correct the command value so as to increase the difference when the preliminary determining process determines that there is a possibility of a malfunction in the vehicle on-board device.

2. The vehicle control device according to claim 1 wherein the processing circuitry is further configured to perform Bayesian updating of the Bayesian network according to at least one of years of use of the vehicle and changes in temperature of the vehicle on-board device.

3. The vehicle control device according to claim 1 wherein the processing circuitry is further configured to perform Bayesian updating of the Bayesian network when the on-board device is replaced or repaired.

4. A non-transitory storage medium storing a vehicle control program executed by an execution device of a vehicle, the vehicle including a vehicle on-board device that includes an actuator related to traveling of the vehicle, a control unit for the actuator, and a detection system that detects a state of the vehicle that changes due to operation of the actuator, the vehicle control program causing the execution device to execute:

a command process that generates a command value for the actuator based on a request related to a driver assistance function from an application requesting unit, and causes the vehicle to travel by outputting the command value to the control unit;

a state quantity acquiring process that acquires at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator;

an event acquiring process that compares at least two values of the vehicle state quantity acquired by the state quantity acquiring process and acquires an event corresponding to a result of the comparison from among multiple events that can occur when the vehicle on-board device is not functioning normally; and an anomaly determining process that determines whether there is an anomaly in the vehicle on-board device by using a Bayesian network that includes, as a node, an occurrence probability of the event acquired by the event acquiring process, wherein the event acquiring process includes executing a preliminary determining process, that:
  determines that there is a possibility of an anomaly in the vehicle on-board device when a difference between a first value of the vehicle state quantity and a second value of the vehicle state quantity among the at least two values of the vehicle state quantity acquired by the state quantity acquiring process is greater than or equal to a first difference determination value, and
  determines that there is a possibility of a malfunction in the vehicle on-board device when the difference is less than the first difference determination value and is greater than or equal to a second difference determination value, which is smaller than the first difference determination value, the event acquiring process includes acquiring, from among the multiple events, an event corresponding to a result of the preliminary determining process, and the command process includes correcting the command value so as to increase the difference when the preliminary determining process determines that there is a possibility of a malfunction in the vehicle on-board device.

5. A vehicle control method employed in a vehicle, the vehicle including a vehicle on-board device that includes an actuator related to traveling of the vehicle, a control unit for the actuator, and a detection system that detects a state of the vehicle that changes due to operation of the actuator, the vehicle control method comprising:

generating a command value for the actuator based on a request related to a driver assistance function from an application requesting unit;

causing the vehicle to travel by outputting the command value to the control unit;

acquiring at least two values of a vehicle state quantity among a vehicle state quantity ideal value, which is a value of the vehicle state quantity at a time when the actuator operates normally according to the command value, a vehicle state quantity detection value, which is a value of the vehicle state quantity based on a detection result of the detection system, and a vehicle state quantity operation value, which is a value of the vehicle state quantity corresponding to an operation amount of the actuator;

comparing at least two values of the acquired vehicle state quantity, and acquiring an event corresponding to a result of the comparison from among multiple events that can occur when the vehicle on-board device is not functioning normally; and determining whether there is an anomaly in the vehicle on-board device by using a Bayesian network that includes, as a node, an occurrence probability of the acquired event, wherein the acquiring at least two values of the vehicle state quantity includes executing a preliminary determining process that:

determines that there is a possibility of an anomaly in the vehicle on-board device when a difference between a first value of the vehicle state quantity and a second value of the vehicle state quantity among the at least two values of the acquired vehicle state quantity is greater than or equal to a first difference determination value, and determines that there is a possibility of a malfunction in the vehicle on-board device when the difference is less than the first difference determination value and is greater than or equal to a second difference determination value, which is smaller than the first difference determination value, the acquiring at least two values of the vehicle state quantity includes acquiring, from among the multiple events, an event corresponding to a result of the preliminary determining process, and the generating the command value for the actuator includes correcting the command value so as to increase the difference when the preliminary determining process determines that there is a possibility of a malfunction in the vehicle on-board device.

* * * * *